United States Patent [19]

Numazawa et al.

[11] 4,406,179
[45] Sep. 27, 1983

[54] APPARATUS FOR PRELOADING AN ANTIFRICTION BEARING IN AN AUTOMATIC TRANSMISSION

[75] Inventors: Akio Numazawa, Nagoya; Seitoku Kubo, Toyota; Koujiro Kuramochi, Okazaki; Tatsuo Kyushima, Toyota, all of Japan

[73] Assignee: Toyota Jidosha Kogyo Kabushiki Kaisha, Toyota, Japan

[21] Appl. No.: 221,306

[22] Filed: Dec. 30, 1980

[30] Foreign Application Priority Data

May 9, 1980 [JP] Japan .................................. 55-60568

[51] Int. Cl.³ ............................................. F16H 37/00
[52] U.S. Cl. .................................................... 74/740
[58] Field of Search .................. 74/740; 411/121, 122, 411/123, 124; 308/143 R

[56] References Cited

U.S. PATENT DOCUMENTS

| | | | |
|---|---|---|---|
| 864,243 | 8/1907 | Hovey | 74/740 |
| 1,658,654 | 2/1928 | Richardson et al. | 308/207 R |
| 1,700,837 | 2/1929 | Fisher | 308/189 R |
| 1,725,142 | 8/1929 | Jeffries | 74/740 |
| 1,765,705 | 6/1930 | Smith | 308/207 R |
| 1,871,684 | 8/1932 | Gibbons | 411/124 |
| 2,189,654 | 2/1940 | Rief | 411/121 |
| 2,406,225 | 8/1946 | Kelbel | 74/270 |
| 2,598,179 | 5/1952 | Kelbel | 74/761 |
| 2,853,890 | 9/1958 | Kelbel | 74/665 |
| 2,936,864 | 5/1960 | Schjolin et al. | 74/740 |
| 3,035,455 | 5/1962 | Peras | 74/645 |
| 3,095,764 | 7/1963 | Peras | 74/763 |
| 3,339,431 | 10/1965 | Groswhite et al. | 74/688 |
| 3,561,291 | 6/1969 | Webster et al. | 74/740 |
| 3,572,169 | 3/1971 | Fisher | 74/763 |
| 3,614,902 | 6/1970 | Candellero | 74/695 |
| 3,800,626 | 4/1974 | Koivunen | 74/695 |
| 3,802,294 | 4/1974 | Smirl | 74/759 |
| 3,979,973 | 9/1976 | Klaue | 74/740 |
| 4,056,988 | 11/1977 | Kubo et al. | 74/695 |
| 4,095,487 | 6/1978 | Cartwright | 74/695 |

FOREIGN PATENT DOCUMENTS

| | | | |
|---|---|---|---|
| 589186 | 12/1959 | Canada | 74/740 |
| 1177949 | 9/1964 | Fed. Rep. of Germany | 74/695 |
| 2722891 | 12/1977 | Fed. Rep. of Germany | 74/695 |
| 915270 | 10/1945 | France | 74/740 |
| 7530245 | 10/1975 | France | |
| 699956 | 11/1953 | United Kingdom | 74/740 |
| 1010931 | 11/1965 | United Kingdom | 74/761 |

Primary Examiner—Leslie A. Braun
Assistant Examiner—L. D. Shannon, III
Attorney, Agent, or Firm—Finnegan, Henderson, Farabow, Garrett & Dunner

[57] ABSTRACT

In a transmission for automobiles including; a housing containing planetary gear units respectively having at least three revolving elements, such as ring gears, sun gears and a carrier; an input shaft connected to one of the revolving elements of the planetary gear units, and an output shaft connected to another one of the three revolving elements of the planetary gear units and rotatably supported on the input shaft through the medium of a first antifriction bearing means consisting of an inner race, an outer race and a roller; the improvements comprising; a face of the input shaft substantially vertical with respect to the axis of the assembly, one of the inner and outer races of the first antifriction bearing means being adapted to engage the face of the input shaft; a second antifriction bearing means disposed between the input shaft and the housing so as to support the input shaft rotatably and consisting of an inner race, an outer race and a roller, and a pressure means screwed with the end of said input shaft; the pressure means being adapted to apply pressure to the first antifriction bearing means via the inner race of the second antifriction bearing means.

5 Claims, 3 Drawing Figures

APPARATUS FOR PRELOADING AN ANTIFRICTION BEARING IN AN AUTOMATIC TRANSMISSION

BACKGROUND OF THE INVENTION

1. Field of the Invention

This invention relates to an automatic transmission for an automobile, wherein a preload of a given level is exerted on antifriction bearings supporting an output gear.

2. Description of the Prior Art

With increase in a duration of time during which an engine is run in a high speed mode, a demand for an automatic transmission with an overdrive device is increasing, for improving a fuel consumption efficiency as well as reducing noise. In an automatic transmission for a front-engine, front-wheel drive automobile, intended to reduce weight of the automobile itself, it is desirable to provide an engine with the crank shaft extending transversely of the automobile. To this end, the axial length, of the automatic transmission must be reduced.

An automatic transmission having a reduced axial length has been proposed in co-pending, commonly-assigned U.S. patent application, Ser. No. 06/031,778. That automatic transmission includes a housing containing planetary gear systems respectively including at least three revolving elements, such as a ring gear, a sun gear and a carrier, an input shaft coupled to one of the revolving elements of the planetary gears, and an output gear coupled to another of the three revolving elements of planetary gears and rotatably supported by the input shaft through the medium of a first antifriction bearing means consisting of an inner race, an outer race and a roller. A preload must be applied to the antifriction bearing. For this purpose, in such an automatic transmission, a nut fitted into the end of the housing is turned to be tightened, so as to move the input shaft, thereby changing a gap in the axial direction between the flange portion of the input shaft and the inner projection of the housing, whereby the preload is adjusted. However, adjustment of a preload can not be accomplished unless components are set in given positions within the housing, for example, unless the overdrive device is set in place. Furthermore, in the aforesaid automatic transmission, it is nearly impossible to measure the dragging torque of an antifriction bearing which must be known in order to determine whether a proper preload is exerted on the antifriction bearing. Even measurement of a dragging torque is possible, inaccurate results are obtained.

SUMMARY OF THE INVENTION

It is accordingly an object of the present invention to provide a transmission for an automobile, wherein adjustment of a preload to be applied on antifriction bearings is allowed before an overdrive device is assembled, and a means for measuring a dragging torque is maintained in direct contact with an output gear supported by the antifriction bearing, so that a highly accurate measurement is obtained.

To attain the above object, there is provided according to the present invention an automatic transmission for an automobile which comprises; a face of an input shaft which is substantially vertical to the axis of the input shaft, and with which one of an inner race and outer race of a first antifriction bearing means abuts, a second antifriction bearing means consisting of an inner race, an outer race and a roller and supporting the input shaft rotatably, the second antifriction bearing means being provided between the input shaft and the housing, and a means for applying a pressure, the pressure-applying means being threaded with the end of the input shaft, and adapted to apply a pre-pressure to the first antifriction bearing means through the medium of the inner race of the second antifriction bearing means.

According to the present invention, if only the input shaft, the antifriction bearings, and the output gear is assembled, adjustment of a preload is permitted by means of a nut serving as a pressure applying means. A means for measuring a dragging torque can be brought into direct contact with the output gear, so that measurement of a dragging torque is conducted with high accuracy.

Preferably, the first antifriction bearing means includes two conical roller bearings, and the second antifriction bearing means is a ball bearing. Pressure-applying means consists of a threaded groove provided in the outer peripheral wall of the end portion of the input shaft, and a nut. A lock member for preventing the loosening of the nut may be provided.

DESCRIPTION OF THE PREFERRED EMBODIMENTS

Figure 1:
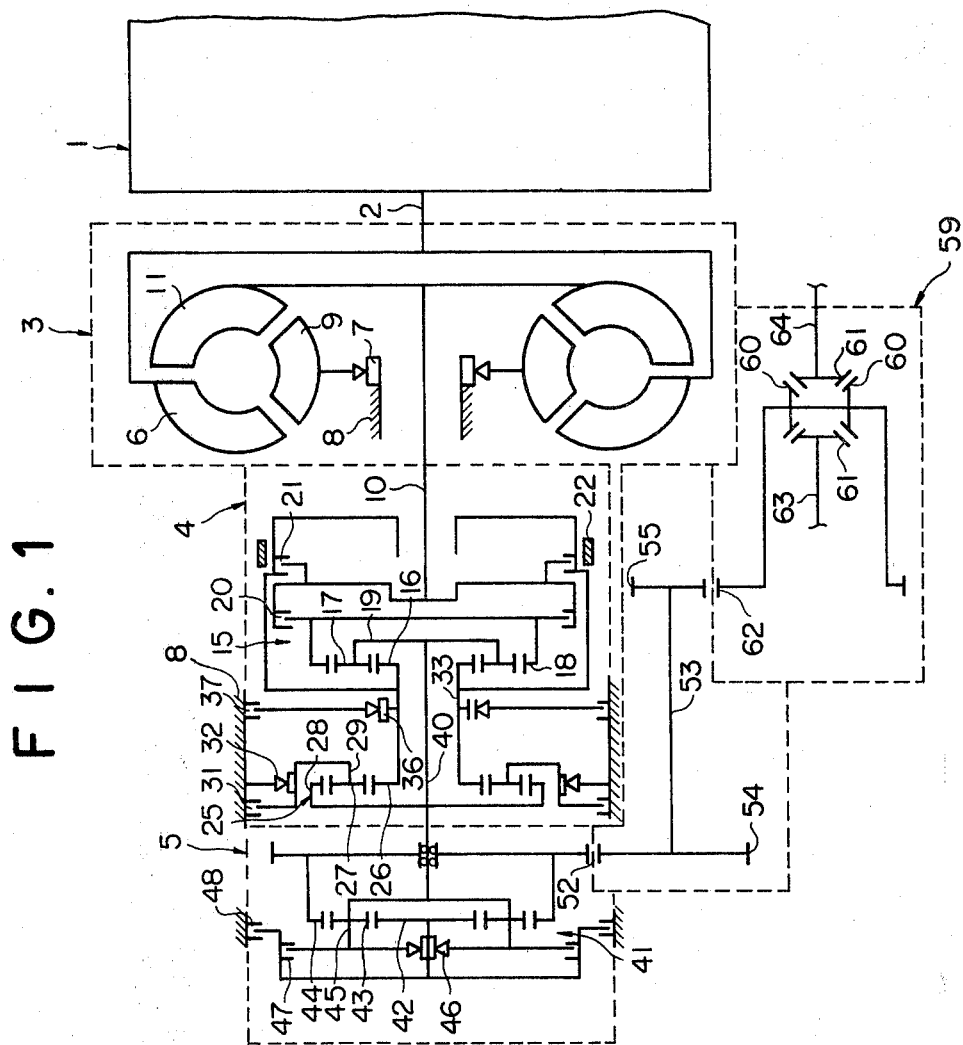
FIG. 1 is a skeleton diagram of an automatic transmission to which the present invention is applied.

An automatic transmission to which the present invention is applied is shown in a skeleton diagram in FIG. 1. An engine 1 has a crank shaft 2 extending transversely of an automobile. A fluid-type torque converter 3, an underdrive unit 4, and an overdrive unit 5 are placed coaxially with the crank shaft 2 in a direction of width of automobile in the order described, as viewed from the side of the engine 1. The fluid-type torque converter 3 is equipped with a pump impeller 6, a stator 9 connected by way of a one-way clutch 7 to the stationary portion 8, and a turbine 11 coupled to a turbine shaft 10. A planetary gear unit 4 of the underdrive device 15, which is positioned near to the fluid-type torque converter 3, includes sun gears 16, pinions 17, ring gears 18 and a carrier 19 rotatably supporting the pinions 17. A clutch 20 controls the connection of the turbine shaft 10 serving as the input portion of the underdrive device 4 to the ring gears 18 of the planetary gear unit 15. A clutch 21 controls connection of the turbine shaft 10 to the sun gears 16, and a brake 22 controls the fixing of the sun gears 16.

A planetary gear unit 25 located on the side of the overdrive device 5 includes sun gears 26, pinions 27, ring gears 28 rotatably and carriers 29 supporting the pinions 27. A clutch 31 and a one-way clutch 32 are provided in parallel to each other, to thereby control connection of the carriers 29 to the stationary portion 8. The sun gears 16 and 26 are mounted on a common sun gear shaft 33. A one-way clutch 36 and a clutch 37 are provided in series relation to each other to control connection between the stationary portion 8 and the sun gear shaft 33. The carrier 19 and the ring gears 28 are coupled to a counter shaft 40.

A planetary gear unit 41 of the overdrive device 5 includes sun gears 42, pinions 43, ring gears 44 and a carrier 45 rotatably supporting the pinions 43. A one-way clutch 46 and a clutch 47 are provided in parallel to each other, to thereby control connection between the sun gears 42 and the carrier 45. A clutch 48 controls connection of the sun gears 42 and the stationary portion 8, and the carrier is coupled to the counter shaft 40.

An output gear 52 is provided in the axially mid portion between the planetary gear units 25 and 41, and connected to the ring gears 44. A transmission shaft 53 extends in parallel to the counter shaft 40 having gears 54 and 55 at the opposite ends thereof. The gear 54 meshes with the output gear 52. A differential device 59 is placed in the central portion in the transverse direction of the vehicle body and includes a pair of deaf pinions 60, a pair of side pinions 61 engaging the diff pinions 60, and a gear 62 engaging the gear 55 of the transmission shaft 53 and provided on the outer surface of a diff casing which rotatably supports the diff pinions 60. The side pinions 61 are coupled to left and right axles 63 and 64, respectively.

The following table shows the relationship of operations of respective engagement members versue transmission positions accomplished thereby. In the Table, the symbol "O" shows respective components being in engagement, and the symbol "Δ" shows that respective components are brought into engagement when the engine brake is applied. Reference numerals in the Table correspond to those of the engagement members illustrated in FIG. 1, respectively.

| Transmission Portion | 20 | 21 | 22 | 31 | 32 | 36 | 37 | 46 | 47 | 48 |
|---|---|---|---|---|---|---|---|---|---|---|
| 1st gear | O | | | Δ | O | | | O | Δ | |
| 2nd gear | O | | Δ | | | O | O | O | Δ | |
| 3rd gear | O | O | | | | | | O | Δ | |
| Overdrive | O | O | | | | | | | | O |
| Reverse | | O | | O | | | | O | | |

Figure 2:
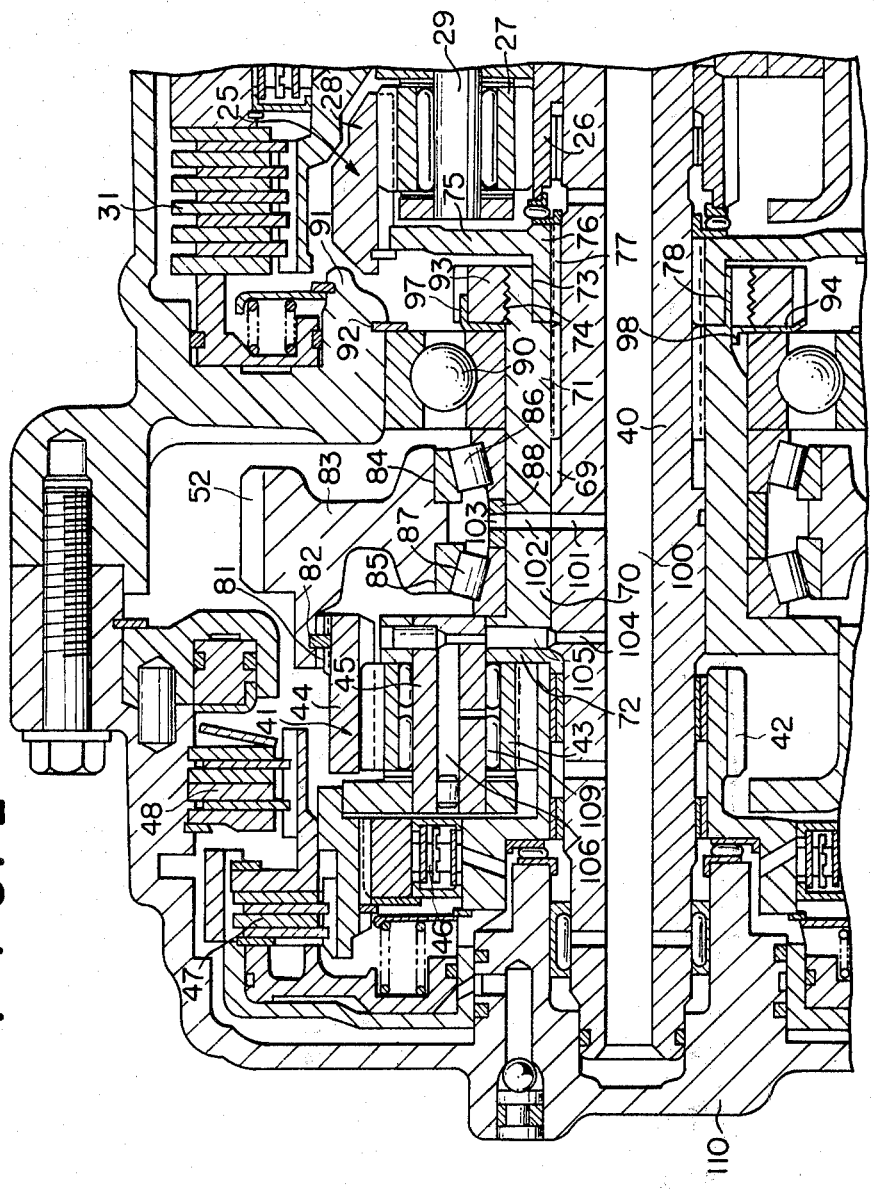
FIG. 2 illustrates the essential part of FIG. 1.

FIG. 2 is illustrative of the essential part of the device according to the present invention. The outer peripheral surface of the counter shaft 40 is splined at 69 in the axially mid portion thereof. A hollow shaft-like member 70 is splined as at 71 partly in the inner peripheral wall thereof, and is fitted on the counter shaft 40, with the spline groove 71 joined to the spline groove 69 of the counter shaft 40. The hollow shaft-like member 70 has at the end near to the planetary gear unit 48 a flange 72, which in turn is connected to the carrier 45.

The shaft-like member 70 has at the other end near to the planetary gear unit 25 an inner-diametrically enlarged, inner peripheral portion 73 and an outer peripheral surface 74 provided with a threaded groove. A hollow boss portion 76 of the rib 75 is fitted into the inner peripheral portion 73 of the shaft-like member 70. The outer peripheral portion 74 of the shaft-like member 70 is provided with a groove 78 of a given depth. The boss portion 76 is splined as at 77 in the inner peripheral wall thereof, which spline is fitted into the spline groove 69 of the counter shaft 40. The radially outer edge of the rib 75 is joined to the ring gear 28 of the planetary gear unit 25.

The output gear 52 is spline-connected at a portion 81 thereof to the ring gear 44. A snap ring 82 is provided in the spline-connected portion 81 of the output gear so as to prevent the relative movement in the axial direction of the ring gear 44 to the output gear 52. A gear member 83 having the output gear 52 on the outer periphery thereof is provided with axially opposite steps 84 and 85 on the inner peripheral wall thereof, into which are fitted outer races of conical roller bearings 86 and 87, respectively. The inner races of the conical roller bearings 86 and 87 are fitted on the shaft-like member 70, with the spacers 88 interposed between these inner races. The outer races of the conical roller bearings 86 and 87 project axially outward by a given length, as compared with the inner races thereof.

Ball bearings 90 are fitted on the shaft-like member 70 and respectively has an inner race contacting the outer race of the conical roller bearing 86, and an outer race connected to a transmission casing 91 serving as a stationary portion. A snap ring 92 prevents an undesired displacement of the outer race toward the underdrive device 4.

Figure 3:
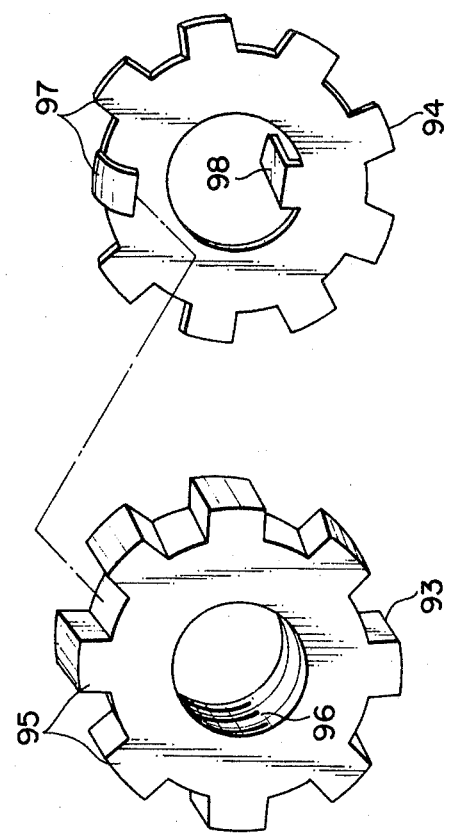
FIG. 3 is a perspective view of a preload adjusting nut and a lock member.

A nut 93 is threadedly fitted on the outer peripheral portion 74 of the shaft-like member 70. After the nut 93 has been tightened to the full, a lock member 94 for preventing the nut from loosening is fitted between the inner race of respective ball bearing 90 and the nut 93. As best seen in FIG. 3, the nut 93 has outer circumferential teeth 95 at an equi-angular spacing from each other and a female thread 96 in the inner peripheral wall thereof, which is threadedly fitted on the outer peripheral portion 74 of the shaft-like member 70. The lock member 94 in the form of plate has outer circumferential teeth 97 at an equi-angular spacing from each other and a raised portion 98 fitted in the groove 78 of a given depth provided in the outer peripheral portion 74 of the shaft-like member 70. The number of teeth 97 of the lock member 94 is increased by one, as compared with the number of teeth 95 of the nut 93. After the nut 93 has been tightened to the full, one of the teeth 97 of the lock member 94 is bent into contact with the trough between teeth 95 of the nut 93. The raised portion 98 of the lock member 94 and the bent tooth 97 cooperate to prevent a relative movement of the nut 93 to the shaft-like member 70.

In order to lubricate and cool respective moving members, oil is supplied into these members. Oil is supplied into the conical roller bearings 86 and 87 from an oil pump by way of an axial hole 100 provided centrally of the counter shaft 40, a radial slot 101 in the counter shaft 40, a radial slot 102 in the shaft-like member 70 and a radial hole 103 in the spacer 88. Oil is supplied into a needle bearing 109 rotatably supporting the pinions 43 of the planetary gear unit 48, by way of the axial hole 100, another radial hole 104 in the counter shaft 40, a radial hole 105 in the flange 72 and a hole 106 in the carrier 45.

Adjustment of a preload exerted on the conical roller bearings 86 and 87 will be referred to. In a prior art device, adjustment of preloads exerted on the conical roller bearings rotatably supporting the output gear 52 only could be achieved from the outside of the overdrive casing 110 after the overdrive device 5 had been assembled. In the device according to the present invention, since the nut is threadedly fitted on the shaft-like member 70, adjustment of the preload is allowed at any stage in the transmission-manufacturing process. More particularly, adjustment of a preload is permitted if only the shaft-like member 70 having the flange 72, the conical roller bearings 86 and 87 assembled on the member 83 having the output gear 52, and the ball bearings 90 are set in place in the positional relationship as shown in FIG. 2. The ball bearings 90 and conical roller bearings 86 and 87 are pressed against the flange 72 by turning the nut 93 in a direction to tighten same on the outer peripheral end portion 74 of the shaft-like member 70. Since movement of the outer race of the conical roller bearing 87 is stopped by the flange 72, the shearing load of the conical bearings 86 and 87 by way of the steps 84 and 85 and the spacer 88 of the gearings member 83 increases as the nut 93 is turned in a direction to be tightened. At a proper timing, a torque measuring means is brought into contact with the output gear 52, so as to detect a dragging torque of respective conical roller bearing, thereby checking up loads exerted on the conical roller bearings 86 and 87. When a load of a given level is established, the turning of the nut 93 is stopped. Thereafter, one of teeth of the lock member 94 is bent into the trough between two teeth of the nut 93 as described above, so as to prevent the nut from loosening.

Adjustment of preload exerted on the conical roller bearings 86 and 87 is allowed if only the shaft-like member 70 having the flange 72 has been assembled and set in place. Furthermore, it is permitted to bring a dragging torque measuring means into direct contact with the gearing member 83, with the result of accuracy of adjustment of a preload.

What is claimed is:

1. In a transmission for automobiles including; a housing containing planetary gear units respectively having at least three revolving elements, such as ring gears, sun gears and a carrier; an input shaft connected to one of said revolving elements of said planetary gear units, and an output means connected to another one of the three revolving elements of said planetary gear units and rotatably supported on said input shaft through the medium of a first antifriction bearing means including an inner race, an outer race and a roller; the improvements comprising;
   - a face of said input shaft substantially normal to the axis thereof, one of the inner and outer races of said first antifriction bearing means being adapted to engage said face of said input shaft;
   - a second antifriction bearing means disposed between said input shaft and said housing so as to support said input shaft rotatably and consisting of an inner race, an outer race and a roller; and
   - a pressure means screwed with the end of said input shaft, said pressure means being adapted to apply pressure to said first antifriction bearing means via the inner race of said second antifriction bearing means.

2. A transmission for automobiles as defined in claim 1, wherein said first antifriction bearing means includes two conical roller bearings mounted on said input shaft with each other, and said second antifriction bearing means is a ball bearing.

3. A transmission for automobiles as defined in claim 2, wherein said pressure means consists of a threaded groove provided in the outer peripheral surface of one end of said input shaft, and a nut.

4. A transmission for automobiles as defined in claim 3, wherein a lock member for preventing the nut from loosening is provided.

5. A transmission for an automobile as defined in claim 4, wherein said input shaft is spline-connected to the outer peripheral surface of another shaft extending in parallel to the central axis of the transmission.

* * * * *